United States Patent [19]
Kranz

[11] 3,708,707
[45] Jan. 2, 1973

[54] FRAME AND CORE-TYPE DYNAMO-ELECTRIC MACHINE

[75] Inventor: Rolf-Dieter Kranz, Mannheim, Germany

[73] Assignee: Aktiengesellschaft Brown, Boveri & Cie, Baden, Switzerland

[22] Filed: May 13, 1971

[21] Appl. No.: 143,030

[30] Foreign Application Priority Data

May 21, 1970 Switzerland..........................7513/70

[52] U.S. Cl..................................................310/258
[51] Int. Cl..................................................H02k 1/18
[58] Field of Search..........310/254, 258, 259, 217, 51

[56] References Cited

UNITED STATES PATENTS

| | | | |
|---|---|---|---|
| 1,764,890 | 6/1930 | Reichel | 310/258 |
| 2,193,408 | 3/1940 | Knight | 310/258 |
| 1,685,054 | 9/1928 | Hibbard | 310/217 X |
| 1,033,379 | 7/1912 | Burke | 310/258 |

*Primary Examiner*—D. F. Duggan
*Attorney*—Pierce, Scheffler & Parker

[57] ABSTRACT

A turbo-generator structure in which the stator, composed of a stack of laminations, is provided with a plurality of uniformly circumferentially spaced longitudinally extending dove-tailed grooves in which are received complementarily configured longitudinally extending wedges. These wedges are stressed into engagement with the sides of the grooves by means of an arrangement of longitudinally spaced screw bolts mounted in longitudinally extending wedge supports which have a rounded section that bear against an arcuate longitudinally extending recess in the surface of the lamination stack as the bolts are tightened by screwing them into the wedges. Thereafter, the stator assembly is inserted into a surrounding corset and secured in place by welding the wedge supports to the corset.

5 Claims, 1 Drawing Figure

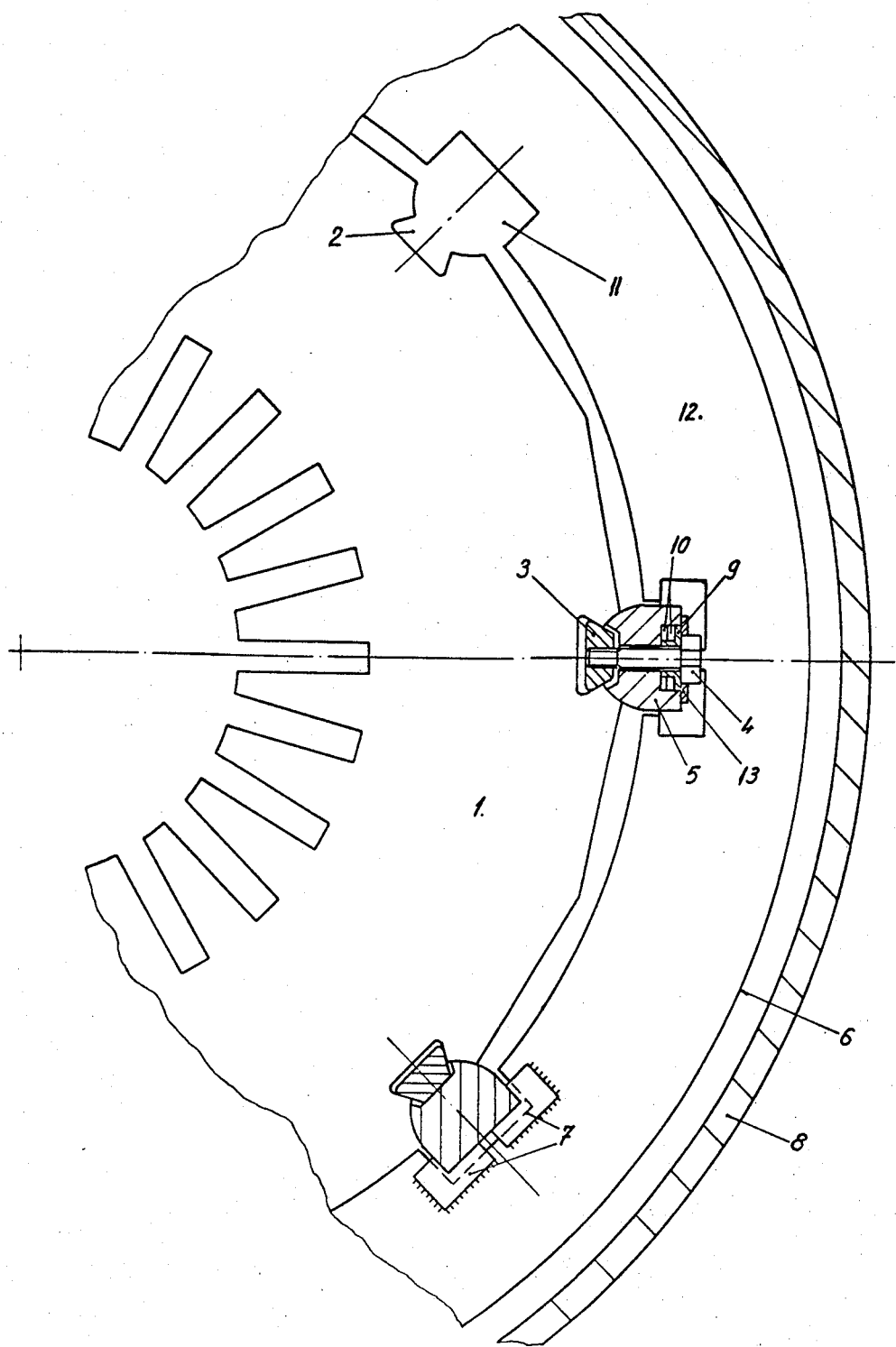

FRAME AND CORE-TYPE DYNAMO-ELECTRIC MACHINE

The present invention relates to a dynamo-electric machine, in particular a turbo-generator, having a stator lamination stack which is suspended in a housing by means of dove-tailed wedges extending along the longitudinal orientation of said lamination stack along its exterior, and also to a method for its production.

It is already known in the turbo-generator art for the stator lamination stack to be suspended in the housing by means of dove-tailed wedges which extend on the exterior of the lamination stack. To this end, the wedges bear on the interior of the housing and the generator torque is transmitted directly via the said wedges and their mounting elements onto the housing.

A construction of this kind however suffers from the disadvantage that the connection between the wedges and the housing, comprising screws and shear pins, are very severely stressed, particularly in the event of a short circuit, thus causing loosening of said connection. For reasons of design, it is not possible for such connections to be subsequently inspected. Moreover, it is also necessary for the interior of the housing to be machined to enable the wedges to bear on the said housing interior, a feature requiring very large and expensive machinery in view of the housing length in common use at the present time and because of the machining tolerances demanded in such systems.

The principal object of the present invention is to provide an electrical machine which is free of these disadvantages.

The electrical machine according to the invention is characterized in that the dove-tailed wedges engaged with complementary configured longitudinally extending grooves at the periphery of the stator lamination stack are stressed by screwed bolts onto wedge supports, one for each wedge and extending in parallel thereto, the said wedge supports being of diminishing section in the radial direction towards the axis of the stator lamination stack to ensure that they can bear without slack on the corresponding surface and are able to absorb forces acting in the radial and circumferential orientation of the stator lamination stack.

It is appropriate for the wedges to be constructed of a material having an electrical conductivity of at least 10 m/ohm mm². It is also advantageous that the two ends of the edges are electrically connected to each other through two short-circuit rings, one for each end. In a preferred embodiment, the ends of the wedge supports are also electrically connected to each other by two short-circuit rings, one for each end, and where appropriate, through the same short-circuit rings as those provided for the wedges.

The invention furthermore relates to a method for the production of an electrical machine provided with a stator corset and characterized in that the stator lamination stack is first assembled whereupon the wedges are inserted into dove-tailed wedge grooves provided on the exterior of the stator laminations stack and are stressed to wedge supports which bear an abutment surfaces provided on the exterior of the stator lamination stack, the stator lamination stack being compressed along its axial orientation by means of compression plates disposed at its ends whereupon the stator lamination stack, stressed in the manner described hereinbefore by the wedges, wedge supports and compression plates, is inserted into the stator corset and fixedly joined thereto after being centered relative to it.

An embodiment of the invention is explained hereinbelow by reference to the accompanying drawing which shows a portion of the stator in transverse section.

As can be seen from the drawing, the stator lamination stack 1 of a turbo-generator is provided on its exterior with dove-tailed wedge grooves 2, extending along its longitudinal orientation. Dove-tailed wedges 3, stressed by means of screw bolts 4 to wedge supports 5 extending in parallel thereto, are disposed in the aforementioned wedge grooves 2.

To enable the wedge supports 5 to bear on the surface without slack and to absorb forces in the radial and circumferential direction of the stator lamination stack 1, they are constructed to have as diminishing section in the radial direction towards the axis of the stator lamination stack so that absolutely no torque is transmitted from the stator lamination stack through the wedges 3 and their mounting bolts 4 to the stator corset 6.

The diminishing section of the wedge support 5 is of arcuate shape so that any distortion of the wedge support has no effect on the manner in which it bears on the lamination stack.

To avoid uncontrolled currents circulating in the stator corset 6, and to ensure effective damping of the stray field, the wedges are constructed of a material having an electrical conductivity of at least 10 m/ohm mm², and their two ends are electrically connected to each other by means of two short-circuit rings, one for each end. The two ends of the wedge support 5 are also electrically connected to each other by means of the circuit rings which are connected to the wedges 3.

As shown in the drawing, the wedge supports 5 are fixedly joined to the stator corset 6 by means of welded lugs 7. The stator corset 6 on the one hand is surrounded by the housing 8 to absorb the torque exerted by the stator lamination stack 1 through the wedge supports 5.

This construction with a stator corset 6 dispenses with the need for precise machining of the surfaces on which the wedge supports 5 bear.

The illustrated stator is assembled by first assembling the stator lamination stack with its longitudinal axis in the vertical direction whereupon the wedges 3 are loosely inserted into the dove-tailed wedge grooves 2 are provided on the outside of the stator lamination stack 1 to be stressed with wedge supports 5 which bear on round cheeks provided on the external surface of the stator lamination stack.

The spacer bushes 9 provided between the head of the screw bolts 4 and the wedge supports 5 enable the plate springs 10 to adjust themselves for uniform thrust and maintain the pull of the screw bolts 4 even if the prestress of one screw bolt was to be reduced, due to some effect. In order to prevent loosening of the screw bolts 4 during operation, lock plates 13 with a hexagon aperture to match the hexagonal bolt heads are additionally provided over the screw bolt heads and are joined to the wedge supports 5 by means of weld spots.

The stator lamination stack 1, stressed by the wedges 3 and the wedge supports 5, may then be inserted into the interior of the stator corset 6, the wedge supports 5 extending in recesses 11 of radially extending cross ribs 12 of the stator corset 6. After centering of the longitudinal axis of the stator lamination stack 1 relative to the stator corset 6, the wedge supports 5 are fixedly welded to the stator corset 6 by means of weld lugs 7 applied to said wedge supports 5 and the cross ribs 12.

By adopting this procedure it is not necessary for the recesses 11 and the cross ribs 12 for mounting the wedge supports 5 to be mechanically machined, a feature offering a substantial advantage in relation to conventional constructions.

The housing 8, disposed around the stator corset 6, is constructed as a gas-tight and pressure-tight vessel to enable a cooling gas to be conducted therethrough.

I claim:

1. A stator structure for a dynamo-electric machine comprising a stack of laminations, said laminated stack including circumferentially spaced and longitudinally extending include dove-tailed provided at the periphery thereof and which included dove-tailed portions, dove-tailed wedges located in said grooves and engageable with the dove-tailed portions thereof, longitudinally extending wedge supports seated in said grooves, said wedge supports being of diminishing section in the radial direction towards the axis of the laminated stack to enable them to absorb forces acting in the radial and circumferential directions of the laminated stack, screw bolts extending through said wedge supports into said dove-tailed wedges for drawing said wedges into a tight engagement with their grooves, and spring means located on said bolts between the bolt heads and wedge supports to maintain the bolts under tensional stress.

2. A stator structure for a dynamo-electric machine as defined in claim 1 wherein said wedges are constructed from a material having an electrical conductivity of at least 10 m/ohm mm$^2$.

3. A stator structure for a dynamo-electric machine as defined in claim 1 and which further includes a corset surrounding said laminated stack, said corset being provided with circumferentially spaced and longitudinally extending recesses in alignment with and receiving said wedge supports and being welded thereto.

4. A stator structure for a dynamo-electric machine as defined in claim 1 wherein the diminishing section of said wedge supports in the radially inward direction is established by an arcuate configuration.

5. A stator structure for a electric machine as defined in claim 1 and which further includes a lock plate for and extending along each of said wedge supports, said lock plate being provided with an aperture at the location of each bolt in which the bolt head is seated to prevent turning thereof.

* * * * *